(12) United States Patent
Chang et al.

(10) Patent No.: US 7,591,047 B2
(45) Date of Patent: Sep. 22, 2009

(54) BIDIRECTIONAL PIVOT STRUCTURE

(75) Inventors: Yang Chih Chang, Taipei (TW); Chih-Chieh Yang, Taipei (TW)

(73) Assignee: Chenming Mold Ind Corp, Taipei (TW)

( * ) Notice: Subject to any disclaimer, the term of this patent is extended or adjusted under 35 U.S.C. 154(b) by 0 days.

(21) Appl. No.: 12/222,335

(22) Filed: Aug. 7, 2008

(65) Prior Publication Data

US 2009/0183342 A1 Jul. 23, 2009

(30) Foreign Application Priority Data

Jan. 18, 2008 (TW) .............................. 97201244 U

(51) Int. Cl.
*E05D 3/10* (2006.01)
(52) U.S. Cl. .......................................... 16/367; 16/374
(58) Field of Classification Search .................. 16/367, 16/342, 374, 366, 371; 248/917, 919, 922, 248/923; 361/680–683, 679.27; 348/333.06
See application file for complete search history.

(56) References Cited

U.S. PATENT DOCUMENTS

| | | | | |
|---|---|---|---|---|
| 6,742,221 B2 * | 6/2004 | Lu et al. | ........................ | 16/367 |
| 6,883,206 B2 * | 4/2005 | Yang et al. | ..................... | 16/367 |
| 7,478,458 B2 * | 1/2009 | Tajima | ........................ | 16/367 |
| 2005/0251965 A1 * | 11/2005 | Lu et al. | ........................ | 16/367 |
| 2008/0000050 A1 * | 1/2008 | Hsu | ............................ | 16/367 |
| 2008/0034545 A1 * | 2/2008 | Shieh | ........................... | 16/367 |
| 2008/0078060 A1 * | 4/2008 | Chen | ........................... | 16/367 |
| 2008/0271293 A1 * | 11/2008 | Hsu et al. | ..................... | 16/367 |

FOREIGN PATENT DOCUMENTS

TW 573910 1/2004

* cited by examiner

*Primary Examiner*—William L. Miller
(74) *Attorney, Agent, or Firm*—Bacon & Thomas, PLLC

(57) ABSTRACT

A bidirectional pivot structure includes a horizontal rotation axis module, a rotation switching device and a vertical rotation axis module. The rotation switching device is pivotally connected to the horizontal rotation axis module and the vertical rotation axis module. The vertical rotation axis module includes an aligning element, a rotation position limiting element, a stabilizing element, a flexible element and a locking element. The rotation position limiting element has a position limiting convex dot and a position limiting arc fitted to a guide rail and a position limiting protrusion of the aligning element for limiting the rotary angle of the vertical rotation axis module. The stabilizing element has a positioning convex dot and a stabilizing protrusion fitted to the positioning holes of the aligning element to maintain a frictional stability. By the design of the aligning element, rotation position limiting element and stabilizing element, the effect of limiting and positioning the vertical rotation axis module can be achieved.

14 Claims, 6 Drawing Sheets

BIDIRECTIONAL PIVOT STRUCTURE

BACKGROUND OF THE INVENTION

1. Field of the Invention

The present invention relates to a bidirectional pivot structure, and more particularly to a bidirectional pivot structure with a function of rotating in both horizontal and vertical directions.

2. Description of the Related Art

Generally, in design of the consuming electronic products having a flip-cover, such as a portable computer, a mobile phone, an electronic dictionary, a portable multimedia player, a digital image capturing device, such as a digital camera or an automobile display, the main body is disposed at a side of the product and pivotally connected with the cover portion by a rotation axis, so that the cover portion can be opened or closed relative to the main body. Therefore, the rotation axis is a major factor for determining the quality of the product. In fact, a good rotation axis not only has necessarily good holding effect, but also is designed with simple elements and convenient assembly, which are important factors when it comes to consideration.

Therefore, manufacturers keep improving their products and have developed a rotation axis which can achieve the objective of bidirectional rotation by single element. For example, "Pivot device" is disclosed in TW Granted Patent Publication No. 573910, which is applied between a screen and a main body of an electronic device. By means of the rotating relation between a rotary seat and a fixed seat, the screen can be rotated within a limited angle along the latitudinal direction, and two legs disposed on the rotary seat can be rotated within a limited angle along the longitudinal direction relatively to the rotary seat. By this way, a single pivot device can provide for more effective usage to users. However, in view of the technical content of the case, the rotary seat includes a tube with a slot which is disposed separately on both sides of a main body and the tube is provided for an insert end of a combining leg to pass, so that combining leg is able to rotate freely. The fixed seat includes a position limiting slice and a strip fixing slice which are respectively installed above and under the rotation axis. After the upper section of the rotation axis is passed through the main body, a plurality of springs and resilient plates are fitted to constitute the pivot device.

In the aforementioned case, the horizontal direction rotation is implemented by a sheathed rotation axis using radial friction, and the vertical direction rotation is implemented by concatenate rotation axis using axial friction. However, as to the simplification of components and the convenience of the assembly (as shown in the drawings of the patent application), if such pivot device is applied in a digital camera, then the its volume must be reduced significantly, and the concatenate rotation axis in vertical direction requires lots of components and a complicated assembly procedure, and it causes a much higher manufacture cost, and a higher level of difficulty to reduce the volume that awaits for further improvement.

In view of the shortcomings of the prior art, the inventor of the present invention based on years of experience to conduct extensive researches and experiments, and finally developed a bidirectional pivot structure to overcome the shortcomings of the prior art.

SUMMARY OF THE INVENTION

Therefore, the objective of the present invention is to provide a bidirectional pivot structure, particularly to provide a bidirectional pivot structure having the function of rotating in both horizontal and vertical directions.

To achieve the foregoing objective, the present invention provides a bidirectional pivot structure comprising a horizontal rotation axis module, a rotation switching device and a vertical rotation axis module. The rotation switching device is pivotally connected to the horizontal rotation axis module and the vertical rotation axis module. The vertical rotation axis module includes an aligning element, a rotation position limiting element, a stabilizing element, a flexible element and a locking element.

The position limiting convex protrusion and a position limiting arc of the rotation position limiting element fit to a guide rail and a position limiting position protrusion of the aligning element respectively, for limiting the rotary angle of the vertical rotation axis module. The stabilizing element includes a positioning convex protrusion and a stabilizing protrusion fitted to positioning holes of the aligning element to maintain a frictional stability. With the design of the aligning element, the rotation position limiting element and the stabilizing element, the present invention achieves the effect of limiting and positioning the vertical rotation axis module. In the meantime, because the present invention adopts an improved aligning element, the volume of the bidirectional pivot structure may be minimized effectively.

More specifically, the rotation switching device includes at least one wedging portion and at least one fixing portion. The fixing portion is provided for connecting the horizontal rotation axis module. The vertical rotation axis module has a hole fitted with the rotation switching device. At least one guide rail is disposed at the periphery of the hole of the aligning element, and at least one position limiting protrusion is disposed on the side opposite to the periphery of the hole. The rotation position limiting element includes at least one first fixing protrusion wedged with a wedging portion of the rotation switching device. The stabilizing element has at least a second fixing protrusion wedged with the wedging portion of the rotation switching device, and the flexible element provides the stabilizing element with a flexible margin. The locking element includes at least one screw and a fixing plate, and the screw is used for securing the fixing plate with the rotation switching device to integrate the rotation switching device with the vertical rotation axis module as a whole.

Further, the aligning element can be comprised of a guide element, a positioning element and a fixing element. At least one guide rail is disposed at the periphery of the hole of the guide element, and at least one position limiting protrusion is disposed at the side opposite to the periphery of the hole. The positioning element has at least one positioning hole, and the fixing element is fastened by the guide element and the positioning element. The rotation position limiting element includes a plurality of grooves for containing a lubricant to make the rotation position limiting element rotate more smoothly.

The aligning element, the guide element or the positioning element is made of a wear-resisting metal material which is preferably a die steel. The flexible element is generally composed of a resilient plate, and the flexible element can further include at least one fourth fixing protrusion wedged with a wedging portion of the rotation switching device.

Due to the description above, by the design of the aligning element, the rotation position limiting element and a stabilizing element, the bidirectional pivot structure of the present invention can perform the effect of positioning and limiting the vertical rotation axis module. By using the rotation switching device to pivotally connect with the horizontal rotation axis module and the vertical rotation axis module, the bidirectional pivot structure can be implemented. By using the aligning element of this present invention, the objective of effectively minimizing the volume of the bidirectional pivot structure can be achieved.

To make it easy for our examiner to understand the art features and effects achieved by this present invention, we provide preferred embodiments accompanied with the related drawings in the following detailed description for assistance.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENTS

The present invention relates to a bidirectional pivot structure. While the specifications describe at least one embodiment of the invention considered best modes of practicing the invention, it should be understood that the invention can be implemented in many ways and is not limited to the particular examples described below or to the particular manner in which any features of such examples are implemented.

Figure 1:
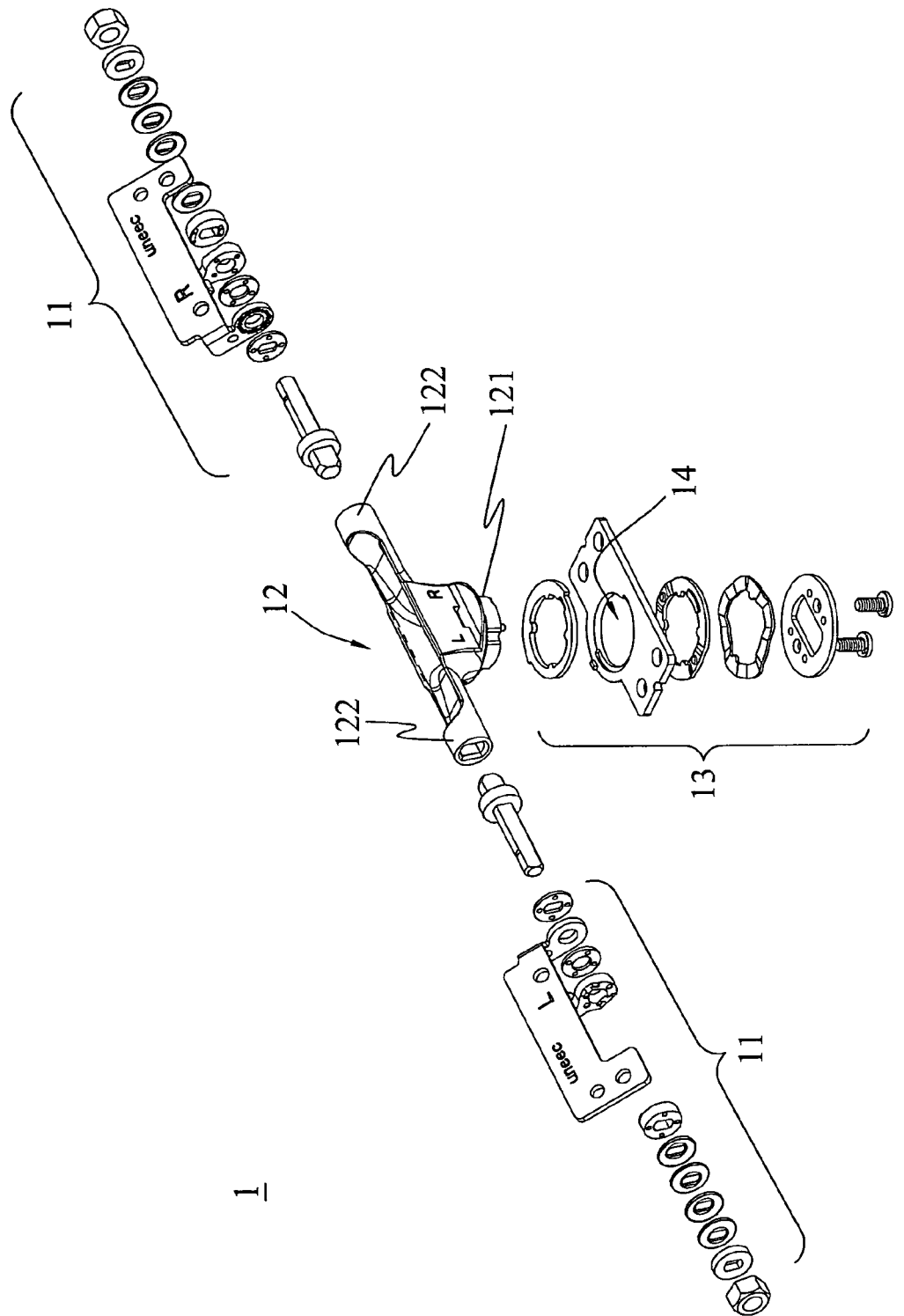
FIG. 1 is an exploded view of a bidirectional pivot structure in accordance with the present invention.

Referring to FIG. 1 for an exploded view of a bidirectional pivot structure of the present invention, the bidirectional pivot structure 1 comprises at least one horizontal rotation axis module 11, a rotation switching device 12 and a vertical rotation axis module 13. The rotation switching device 12 includes at least one wedging portion 121 and at least one fixing portion 122 pivotally connected to the horizontal rotation axis module 11, and the vertical rotation axis module 13 includes a hole 14 for fitting the rotation switching device 12.

Figure 2:
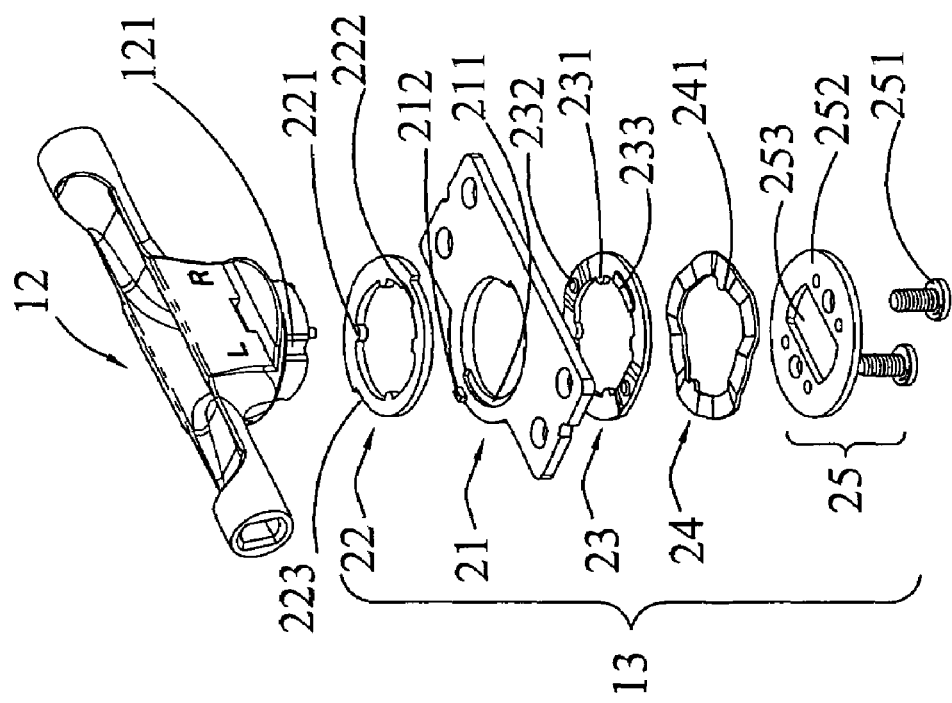
FIG. 2 is an exploded view of a rotation switching device and a vertical rotation axis module of a bidirectional pivot structure in accordance with the present invention viewing from a first angle of vision.
Figure 3:
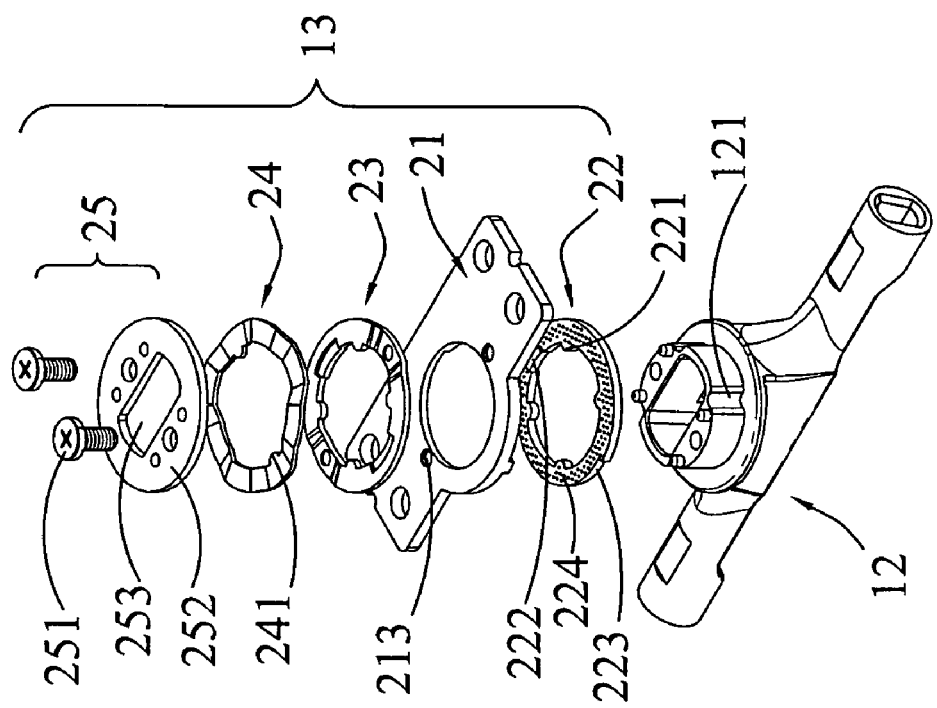
FIG. 3 is an exploded view of a rotation switching device and a vertical rotation axis module of a bidirectional pivot structure in accordance with the present invention viewing from a second angle of vision.

Referring to FIG. 2 for an exploded view of the rotation switching device and the vertical rotation axis module of a bidirectional pivot structure in accordance with this present invention viewing from a first angle of vision and FIG. 3 for an exploded view of a rotation switching device and a vertical rotation axis module of a bidirectional pivot structure in accordance with the present invention viewing from a second angle of vision, the vertical rotation axis module 13 comprises an aligning element 21, a rotation position limiting element 22, a stabilizing element 23, a flexible element 24 and a locking element 25. At least one guide rail 211 is disposed at the periphery of hole 14 of the aligning element 21, and at least one position limiting protrusion 212 is disposed on the other side of the periphery of hole 14. The aligning element 21 has at least one positioning concave protrusion 213. The rotation position limiting element 22 has at least one first fixing protrusion 221, at least one position limiting convex protrusion 222 and at least one position limiting arc 223. The first fixing protrusion 221 is wedged to a wedging portion 121 of the rotation switching device 12, and the position limiting convex protrusion 222 can slide in a guide rail 211 of the aligning element 21, and the position limiting arc 223 corresponds to the position limiting protrusion 212 of the aligning element 21. The rotation position limiting element 22 further has a plurality of grooves 224 for containing a lubricant to make the rotation position limiting element 22 rotate more smoothly. The lubricant can be the common lubricating oil. The stabilizing element 23 has at least one second fixing protrusion 231, at least one positioning convex protrusion 232 and at least one stabilizing protrusion 233. The second fixing protrusion 231 is wedged to the wedging portion 121 of the rotation switching device 12, and the positioning convex protrusion 232 corresponds to a positioning concave protrusion 213 of the aligning element 21. The stabilizing protrusion 233 is pressed and engaged with the aligning element 21, so that the stabilizing element 23 and the aligning element 21 can rub with each other stably. The flexible element 24 provides the stabilizing element 23 with a flexible margin, and is sheathed onto the rotation switching device 12 corresponding to the stabilizing element 23 and has at least one fourth fixing protrusion 241 wedged to the wedging portion 121 of the rotation switching device 12. The locking element 25 includes at least one screw 251 and a fixing plate 252, and the screw 251 is provided for securing the fixing plate 252 with the rotation switching device 12, so that the rotation switching device 12 and the vertical axis module 13 are integrated as a whole. The fixing plate 252 has a through hole 253 corresponding to the hole 14.

Figure 4:
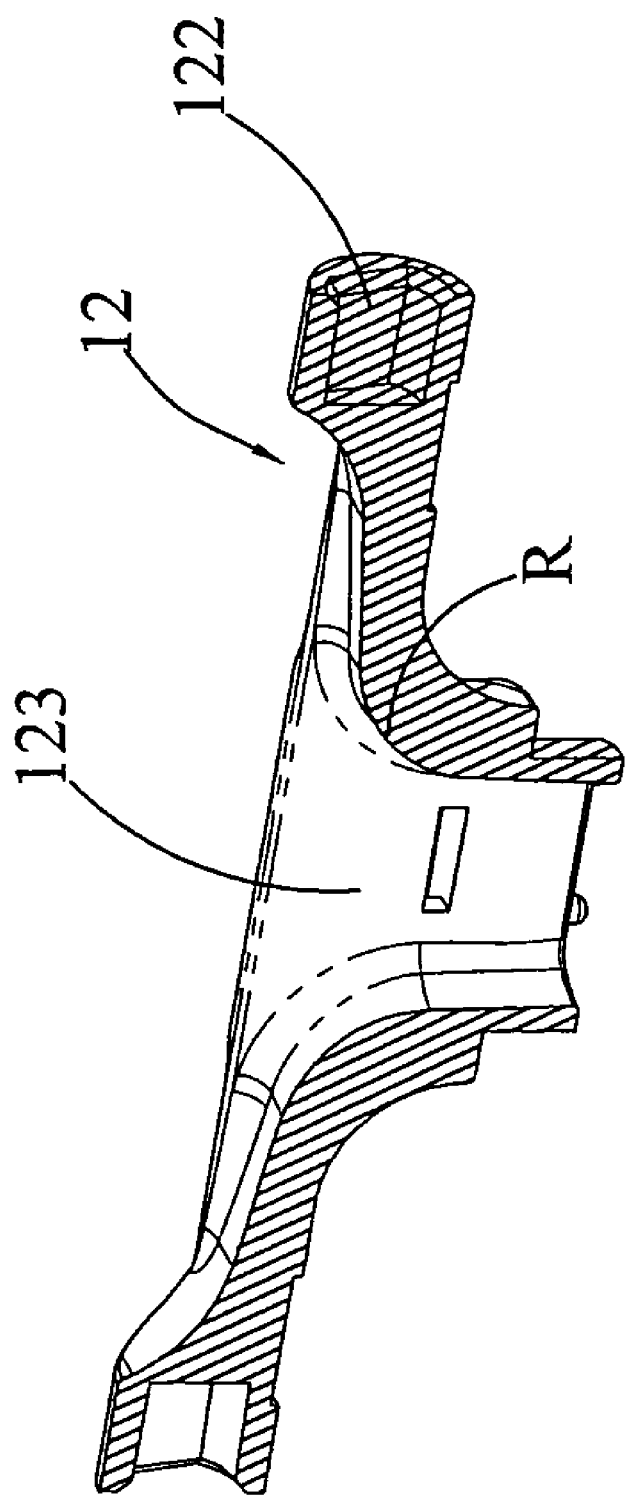
FIG. 4 is a sectional view of a rotation switching device of a bidirectional pivot structure in accordance with the present invention.

Referring to FIG. 4 for a sectional view of a rotation switching device of a bidirectional pivot structure in accordance with the present invention, the rotation switching device 12 has a passage 123 corresponding to the hole 14 and the through hole 253, and the passage 123 has an arc opening R with a curvature at a side opposite to the vertical rotation axis module 13.

Figure 5:
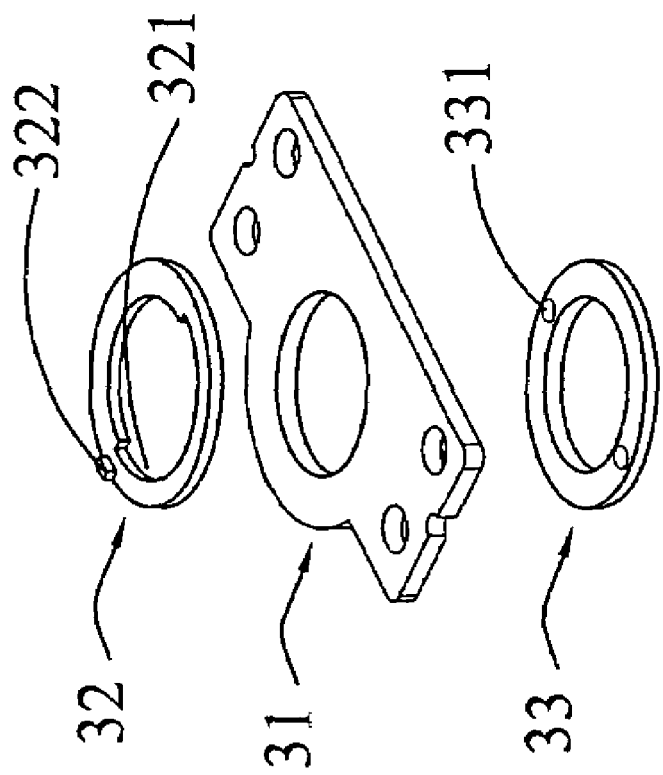
FIG. 5 is an exploded view of an aligning module of a bidirectional pivot structure in accordance with the present invention.

Referring to FIG. 5 for an exploded view of an aligning module of a bidirectional pivot structure in accordance with the present invention, the aligning module includes a guide element 32, a positioning element 33 and a fixing element 31. At least one guide rail 321 is disposed at the periphery of hole 14 at the guide element 32, and at least one position limiting protrusion 322 is disposed on the side opposite to the periphery of hole 14. The positioning element 33 has at least one positioning hole 331. The fixing element 31 is fastened by the guide element 32 and the positioning element 33.

Figure 6:
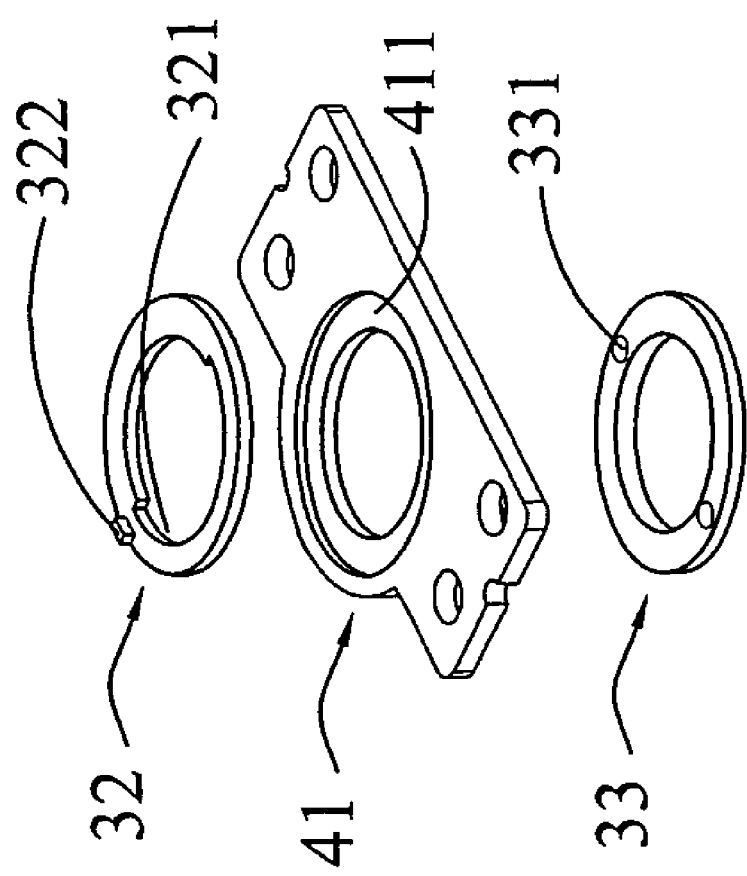
FIG. 6 is an exploded view of another aligning module of a bidirectional pivot structure in accordance with the present invention.

Referring to FIG. 6 for an exploded view of another aligning module of a bidirectional pivot structure in accordance with the present invention, the aligning module includes a guide element 32, a positioning element 33 and a fixing element 41. At least one guide rail 321 is disposed at the periphery of hole 14 at the guide element 32, and at least one position limiting protrusion 322 is disposed on the side opposite to the periphery of hole 14. The positioning element 33 includes at least one positioning hole 331. Both sides of the fixing element 41 are respectively disposed with a concave ring 411 which is embedded and fastened by the guide element 32 and the positioning element 33.

In summation of the description above, the aligning element 21, the guide element 32 or the positioning element 33 is made of a wear-resisting metal material which is preferably a die steel. The flexible element 24 is preferably comprised of at least one resilient plate.

While the present invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the present invention as defined by the appended claims.

What is claimed is:

1. A bidirectional pivot structure, comprising:
    at least one horizontal rotation axis module;
    a rotation switching device having at least one wedging portion, and at least one fixing portion pivotally connected to the horizontal rotation axis module; and
    a vertical rotation axis module having a hole fitted with the rotation switching device, and further comprising:
    an aligning element having at least one guide rail disposed at the periphery of the hole, at least one position limiting protrusion disposed on the side opposite to the hole, and at least one positioning concave protrusion;
    a rotation position limiting element having at least one first fixing protrusion, at least one position limiting convex protrusion and at least one position limiting arc, wherein the first fixing protrusion is disposed at the periphery of the hole and wedged with the wedging portion of the rotation switching device, and the position limiting convex protrusion slides in the guide rail of the aligning element, and the position limiting arc is matched with the position limiting protrusion of the aligning element;
    a stabilizing element having at least one second fixing protrusion, at least one positioning convex protrusion and at least one stabilizing protrusion, wherein the second fixing protrusion is disposed at the periphery of the hole and wedged to the wedging portion of the rotation switching device, and the positioning convex protrusion fits to the positioning concave protrusion of the aligning element, and a stabilizing nose is engaged with the aligning element to make the stabilizing element align with the aligning element;
    a flexible element for providing a flexible margin with stabilizing element to sheathe the stabilizing element onto the rotation switching device; and
    a locking element having at least one screw and a fixing plate, and the screw securing the fixing plate with the rotation switching device, so that the rotation switching device and the vertical rotation axis module are integrated as a whole, and the fixing plate includes a through hole corresponding to the hole.

2. The bidirectional pivot structure of claim 1, wherein the rotation switching device has a passage corresponding to the hole and the through hole, and the passage has an arc opening corresponding to a side of the vertical rotation axis module.

3. The bidirectional pivot structure of claim 1, wherein the rotation position limiting element includes a plurality of grooves for containing a lubricant.

4. The bidirectional pivot structure of claim 1, wherein the aligning element is made of a wear-resisting metal material.

5. The bidirectional pivot structure of claim 4, wherein the wear-resisting metal material is a die steel.

6. The bidirectional pivot structure of claim 1, wherein the flexible element includes at least one resilient plate.

7. The bidirectional pivot structure of claim 1, wherein the flexible element includes at least one fourth fixing protrusion which is wedged to the wedging portion of the rotation switching device.

8. A bidirectional pivot structure, comprising:
    at least one horizontal rotation axis module;
    a rotation switching device having at least one wedging portion, and at least one fixing portion pivotally connected to the horizontal rotation axis module; and
    a vertical rotation axis module having a hole fitted with the rotation switching device, and the vertical rotation axis module comprising:
    a guide element having at least one guide rail disposed at the periphery of the hole, and at least one position limiting protrusion disposed on the side opposite to the periphery of the hole;
    a positioning element having at least one positioning hole;
    a fixing element fastened by the guide element and the positioning element;
    a rotation position limiting element having at least one first fixing protrusion, at least one position limiting convex protrusion and at least one position limiting arc, wherein the first fixing protrusion is disposed at the periphery of the hole and wedged to the wedging portion of the rotation switching device, and the position limiting convex protrusion slides in the guide rail of the guide element, and the position limiting arc is matched with a position limiting nose of the guide element;
    a stabilizing element having at least one second fixing protrusion, at least one positioning convex protrusion and at least one stabilizing protrusion, wherein the second fixing protrusion is disposed at the periphery of the hole and wedged to the wedging portion of the rotation switching device, and the positioning convex protrusion fits to the positioning hole of the positioning element, and the stabilizing protrusion is pressed and engaged with the positioning element to align the stabilizing element with the positioning element;
    a flexible element for providing the stabilizing element with a flexible margin to sheathe the stabilizing element onto the rotation switching device; and
    a locking element including at least one screw and a fixing plate, and the screw securing the fixing plate with the rotation switching device to make the rotation switching device and the vertical rotation axis module integrate as a whole, and the fixing plate has a through hole corresponding to the hole.

9. The bidirectional pivot structure of claim 8, wherein the rotation switching device has a passage corresponding to the hole and the through hole, and the passage has an arc opening corresponding to a side of the vertical rotation axis module.

10. The bidirectional pivot structure of claim 8, wherein the rotation position limiting element has a plurality of grooves for containing a lubricant.

11. The bidirectional pivot structure of claim 8, wherein the guide element or the positioning element is made of a wear-resisting metal material.

12. The bidirectional pivot structure of claim 11, wherein the wear-resisting metal material is a die steel.

13. The bidirectional pivot structure of claim 8, wherein the flexible element includes at least one resilient plate.

14. The bidirectional pivot structure of claim 8, wherein the flexible element includes at least one fourth fixing protrusion disposed thereon and wedged to the wedging portion of the rotation switching device.

* * * * *